United States Patent [19]
Dubell et al.

[11] Patent Number: 5,297,385
[45] Date of Patent: Mar. 29, 1994

[54] COMBUSTOR

[75] Inventors: Thomas L. Dubell, Palm Beach Gardens; James H. Shadowen, Riviera Beach, both of Fla.

[73] Assignee: United Technologies Corporation, Hartford, Conn.

[21] Appl. No.: 200,480

[22] Filed: May 31, 1988

[51] Int. Cl.⁵ ............................................. F02C 3/06
[52] U.S. Cl. ................................. 60/39.36; 60/39.32; 60/756; 60/757
[58] Field of Search .................. 60/39.36, 756, 757, 60/39.66, 39.69, 39.65, 39.32, 39.36

[56] References Cited
U.S. PATENT DOCUMENTS

| 4,222,230 | 9/1980 | Bobo | 60/39.36 |
| 4,696,157 | 9/1987 | Barbier | 60/39.36 |
| 4,720,970 | 1/1988 | Hudson | 60/39.36 |

Primary Examiner—Donald P. Walsh
Attorney, Agent, or Firm—Norman Friedland

[57] ABSTRACT

An annular combustor for a gas turbine engine includes a sector in the primary combustion zone that operates at a reduced level of airflow than the remaining portion of the combustor by providing fixed air openings in the dome or fuel nozzles and in the combustion air admission holes. This allows the combustor to operate at higher fuel/air ratios with a minimum of complexity in the hardware.

4 Claims, 3 Drawing Sheets

COMBUSTOR

TECHNICAL FIELD

This invention relates to gas turbine engines and particularly to the annular combustor.

BACKGROUND OF THE INVENTION

As is well known the combustors for gas turbine engines have, from a technical standpoint, made significant advances in the state of the art over recent years. Combustor efficiency, for example, for aircraft jet engines operates in the high 90 percentile. Additionally, the technology has made significant improvement in reducing or eliminating pollutants and/or smoke emanating from the combustion process.

However, the requirements for combustors that are intended to meet demands for future aircraft needs will require even further advances in combustor technology. Obviously, aircraft engine performance is predicated on attaining high turbine inlet temperatures. Higher inlet turbine temperature, within a given limit, will manifest into improved thrust-to-weight ratios and specific fuel consumption with a consequential improvement in engine performance.

Thus, future demands will require that the advanced combustion system attendant these high performance engines will have to operate at a temperature rise at high power that is significantly higher than that of state-of-the-art combustors. However, it is of paramount importance that the designer of the combustor meets the increased temperature rise requirement without degrading heretofore established levels of performance, smoke density and pollutants exhausting from the engine.

In addition to the demanding requirements already alluded to, the combustor must be able to be re-lighted within specified altitudes. And when these engines are employed in lightweight aircraft, it is contemplated that the combustor will operate at lower than the levels of temperature rise associated with state-of-the-art combustors during engine deceleration and idle and will be required to be sufficiently stable in order to facilitate ground handling.

To gain better insight to the complexity and operability problems posed by high temperature rise combustors, it perhaps will be worthwhile comparing the requirements of the combustor with the stability characteristics of the combustion process. To this end, the graph which is a plot of fuel/air ratio vs. the stability correlation parameter is presented in FIG. 1. As is known, since most combustion occurs in the combustor's primary zone or region, this section of the combustor is selected for discussion purposes. The stability correlation parameter which has become a standard measurement in the combustor art contains the following terms applied to the primary zone:
V=Average through-flow velocity
P=Pressure level
T=Inlet Air Temperature When these terms are combined in a non-dimensional parameter ($V/PT^2$) increasing velocity, decreasing pressure and/or decreasing temperature increases the stability parameter to higher levels. They likewise adversely affect the combustion process by making it more difficult for supporting combustion. Stated another way, higher values of the stability parameter incur more severe and more difficult combustor operating requirements.

As is noted from an inspection of FIG. 1, the curve defines stability limit which is generated by reducing and increasing fuel/air ratios until blowout occurs. Hence, combustor operations falling within the left-hand side of the parabola-shaped stability limit curve A will be stable and any operations to the right of curve A will be unstable. Further, curve B defines an upper limit of fuel/air ratio and operations above this limit will exhibit excessive levels of smoke.

Hence, as is apparent from the foregoing in combustor operation for conventional, state-of-the-art combustors, the primary zone fuel/air ratios are set so that they fall below curve B and the engine deceleration, idle and altitude re-ignition requirements fall within the left-hand side (stable operation) of curve A. This is shown by curve C and altitude re-light operation is defined as operating point E, using as a standard an altitude of 30 thousand feet and the aircraft flight speed of 0.8 Mach Number as the point of re-ignition.

Curve F represents the combustor operations at increased levels of temperature rise contemplated for future advanced technology engines. Obviously, to assure combustion operation is below the smoke limit (B), the combustor primary zone air flow must likewise be increased, moving the combustor operating curve F closer to stability curve A, which obviously illustrates the increased severity of the requirements of the combustor. And, as noted, the deceleration and the altitude ignition represented by point G may fall outside of the stability limits (curve A). And what is indeed apparent, the trend is such that as temperature rise increases to a higher value, the combustor's operating line moves even to more severe requirements such that even the idle (points H and J on curves C and F, respectively) may likewise fall outside of the stability limit (curve A).

Engineers and scientists have been battling with this problem for some time and have attempted to resolve it by several different approaches. Some of these approaches, all of which have exhibited significant disadvantages, include variable fuel staging, variable geometry and double annular combustor. There are no known solutions demonstrated in the prior art which satisfactorily solve the problems alluded to above.

Fuel staging contemplates delivering fuel to the combustor through fuel nozzles wherein some nozzles flow more fuel than others so that fuel flow is scheduled for two or more types of fuel nozzle. By proper scheduling it is therefore possible to provide localized fuel enrichment in a portion of the combustor thereby holding the deceleration and idle conditions of curve F within the stability limits as shown by the dash line K extending from the bottom of curve F. These systems do not resolve the basic stability requirements and may still have the altitude ignition problem as noted by point G' in the graph of FIG. 1.

Variable geometry combustor offers a more realistic approach to solving the problems enumerated above but only at the expense of additional costs, weight and complexity associated with the hardware necessary to make the geometry variable. In this approach, the airflow to the primary zone is varied by mechanically adjusting the air metering orifices. Hence, the fuel/air ratio and stability parameter at given combustor operating points are altered so that the operating requirements remain in the stable region which is to the left of curve A.

The last of the approaches suggested is the double annular combustor and this combustor arrangement utilizes airflow staging to solve the problems alluded to above. An example of a double annular combustor is disclosed in U.S. Pat. No. 3,934,409 granted to H. A. Quillevere et al on Jan. 27, 1976.

In these combustors the primary zone is made up with an inner annulus and an outer annulus. One of these annuli (primary) is designed to accept a relatively low airflow which will exhibit good stability characteristics. The other annulus (secondary) accepts a relatively higher airflow and is allowed to exceed stability limits at low power and altitude ignition operating conditions. Given that the primary annulus will sustain and propagate combustion to the secondary annulus, combustion will be sustained and the combustor is relightable at altitude conditions.

However, the double annular construction inherently requires extra air admission devices and fuel nozzles resulting in a heavier and more expensive combustion system.

These types of approaches described above as well as conventional state-of-the-art combustion systems all provide circumferentially uniform airflow distribution. In some instances the airflow distribution may be locally tailored in some manner around fuel nozzles or diffuser struts to provide uniform exit temperature distribution. An example of localized tailoring of airflow around the fuel nozzle is disclosed in U.S. Pat. No. 4,696,157 granted to G. Y. G. Barbier et al on Sep. 29, 1987. This patented system as well as the other systems alluded to herein repeat the airflow distribution around the combustor and this distribution is a function of the fuel nozzles or a function of diffuser struts in the case of attempting to compensate for the diffuser struts.

In all these instances, the designer intends to provide circumferentially uniform or circumferentially repetitive airflow distribution. Additionally, the fuel flow distribution is uniform from nozzle to nozzle during high power operation.

Another approach that is worthy of mention is the approach disclosed in U.S. Pat. No. 4,720,970 granted to D. A. Hudson et al. on Jan. 26, 1988 and that approach is akin to the variable geometry approach alluded to in the above. In the U.S. Pat. No. 4,720,970, supra, the dome of the annular combustor is circumferentially divided into a sector or sectors. Airflow control valves vary the airflow in a given sector(s) to define a region in the primary zone for varying the fuel/air ratio and control the burning in that sector(s). However, like the variable geometry approaches mentioned above, this system incurs the same disadvantages.

We have found that we can obviate the disadvantages detailed hereinabove while extending combustor lean extinction and stability limits.

DISCLOSURE OF THE INVENTION

It is an object of this invention to provide an improved annular combustor for a gas turbine that is capable of operation at increased levels of temperature rise while attaining stability and achieving high altitude relight capabilities.

A feature of this invention is to provide a circumferentially zoned combustor including a sector having a different airflow distribution to maintain a stable operating range for all engine operating conditions. Fuel flow is likewise non-uniformly distributed around the circumference to balance the airflow distribution and provide a uniform exit temperature pattern.

Additional features of this invention are to be able to utilize existing combustor technology and hardware and minimize the complexity, size, weight and cost of the combustion system.

The foregoing and other features and advantages of the present invention will become more apparent from the following description and accompanying drawing(s).

BEST MODE FOR CARRYING OUT THE INVENTION

While in its preferred embodiment, the invention is described as applied to a conventional single annular combustor, as will be appreciated by those skilled in this art the invention may be equally employed with any multi-nozzle combustion system. While the annular combustor is described herein utilizing a conventional annular burner liner fabricated from sheet metal in a louvered configuration, it is to be understood that the particular details of the construction of the combustor and its liner may be like any of the other well-known constructions.

Figure 2:
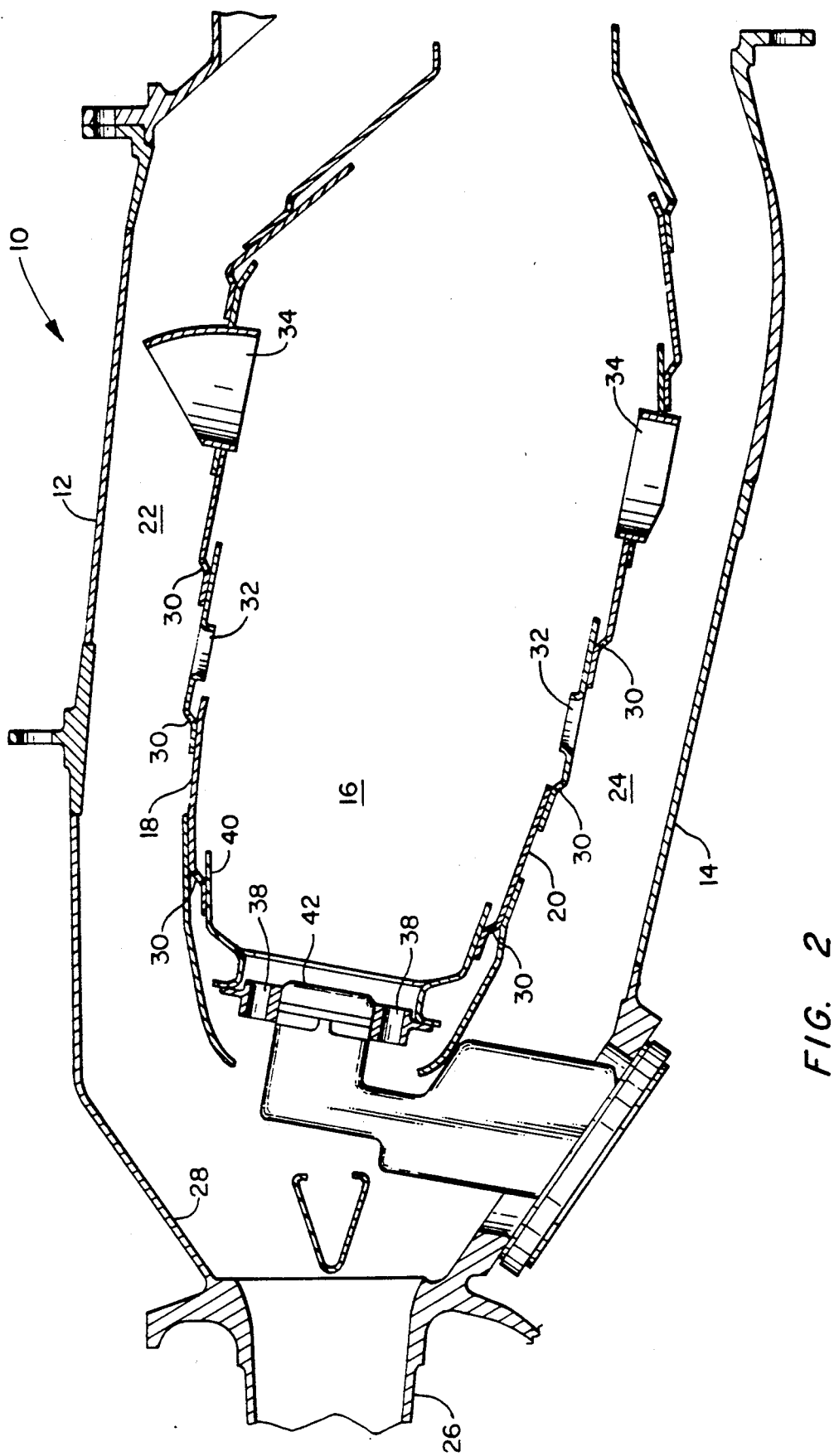
FIG. 2 is a partial view partly in section and partly in schematic illustrating a conventional combustor adaptable to be configured to incorporate the invention.

Reference in now made to FIG. 2 showing a conventional combustor generally illustrated by reference numeral 10 having an outer combustor case 12 and an inner combustor case 14, which is suitably joined to the other engine case members (not shown). For the sake of simplicity and convenience the details of the gas turbine engine is omitted herefrom, but reference should be made to any of the engine models employing annular combustion chambers, as for example, the JT9D and F100 family of engines manufactured by Pratt & Whitney Aircraft division of United Technologies Corporation, the assignee of this patent application, all of which are incorporated herein by reference.

Suffice it to say that the annular combustion zone 16 is defined by the outer louver liner 18 and the inner louver liner 20, both of which are spaced from the adjacent combustor case members 12 and 14, respectively, and defining therewith annular passageways 22 and 24. Cool air from the engine's compressor (not shown) is admitted to passageways 22 and 24 via the prediffuser 26, dump diffuser 28 such that a portion of the air flows through apertures 30 formed by the louver liner for film cooling the liner and another portion of the air is admitted into the combustor for combustion purposes via combustion air holes 32 and another portion is admitted (via dilution air holes 34) for cooling the combustion gases. A portion of the air is admitted through openings 38 formed in the dome 40 which openings may take the form of air swirl nozzles fabricated in the fuel nozzles. The sizes of all of these openings determine the axial and circumferential air flow distribution entering the combustor as well as fixing the fuel/air ratio of the primary zone formed adjacent the dome 40.

Fuel is admitted to the combustor through any suitable fuel nozzle generally illustrated by reference numeral 42. A plurality of fuel nozzles 42 (one being shown) is circumferentially spaced equidistant and supported in dome 40.

According to this invention at least one sector of the combustor within the primary zone is operated at a stable condition during the entire operating envelope of the combustor. Hence, to attain the higher temperature rise the remaining circumferential zone will have a higher distribution of air than the other sector and there will be a non-uniformity of airflow around the entire circumference.

Likewise, fuel flow to the combustor is circumferentially non-uniform so as to balance the airflow distribution and provide a uniform combustor exit pattern. This is accomplished by sizing the air orifices in the dome to provide the desired airflow requirement. Likewise, the orifice sizes of the fuel nozzles can be selected to provide the requisite fuel distribution. From the foregoing it will be evident that conventional annular combustors can easily be modified to utilize this invention.

Figure 3:
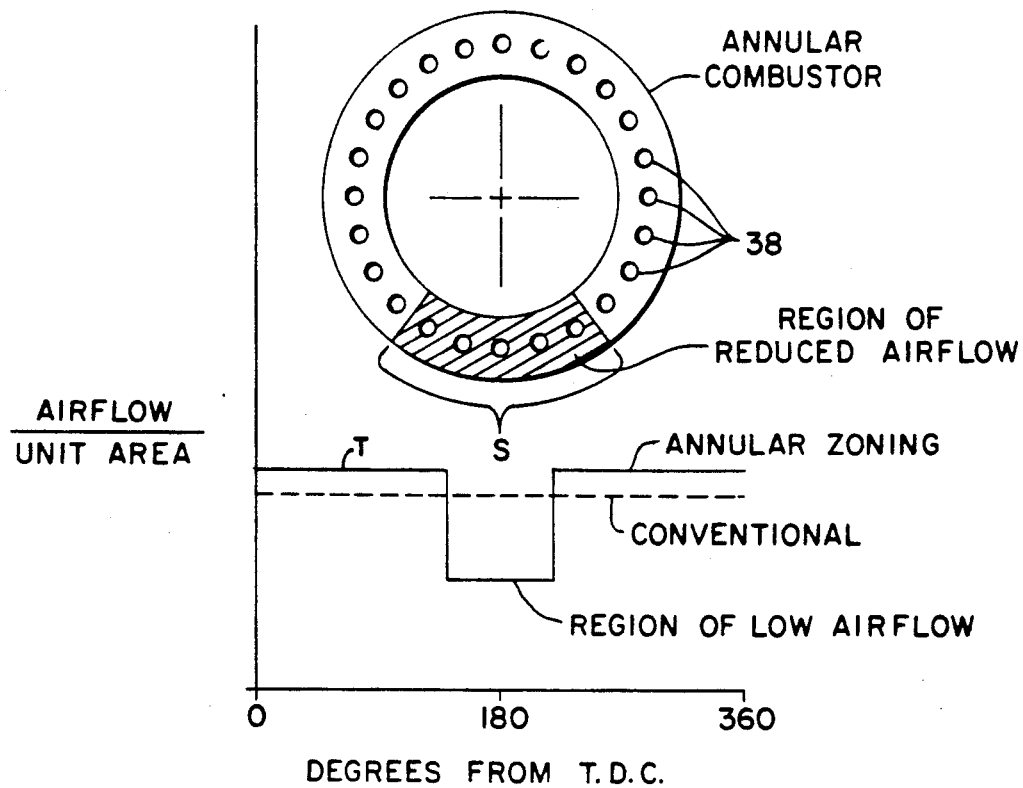
FIG. 3 is a schematic showing of the arrangement of the fuel nozzles and airflow distribution around the dome of the combustor.

The flow distribution is best appreciated by referring to FIG. 3 which schematically shows the air openings around the circumference of the combustor. The air openings 38 correspond to the air openings 38 in FIG. 2. As noted above, this invention contemplates a low airflow sector within the combustor identified by reference letter S. The graph depicted in FIG. 3 shows the distribution of air around the circumference of the annular combustor. The curve T represents the airflow distribution and the depending portion of curve T shows the airflow in the reduced airflow sector which receives its air through the portion of the air openings 38 and the portion of combustion air holes 32 which are sized to flow a reduced airflow relative to the non-reduced sized air holes. As is apparent from the foregoing the flow distribution in the S sector is reduced from the flow in the circumferential portion of the combustor. The fuel flow nozzles which are aligned centrally of these air openings will also be selected to provide the requisite fuel flow to provide the desired fuel/air ratio. It will be appreciated that this invention contemplates one or more sectors such that, for example, it may be desirable to locate a reduced airflow sector adjacent each of the igniters of the combustor, assuring that stable operation is at the location where ignition takes place.

Figure 1:
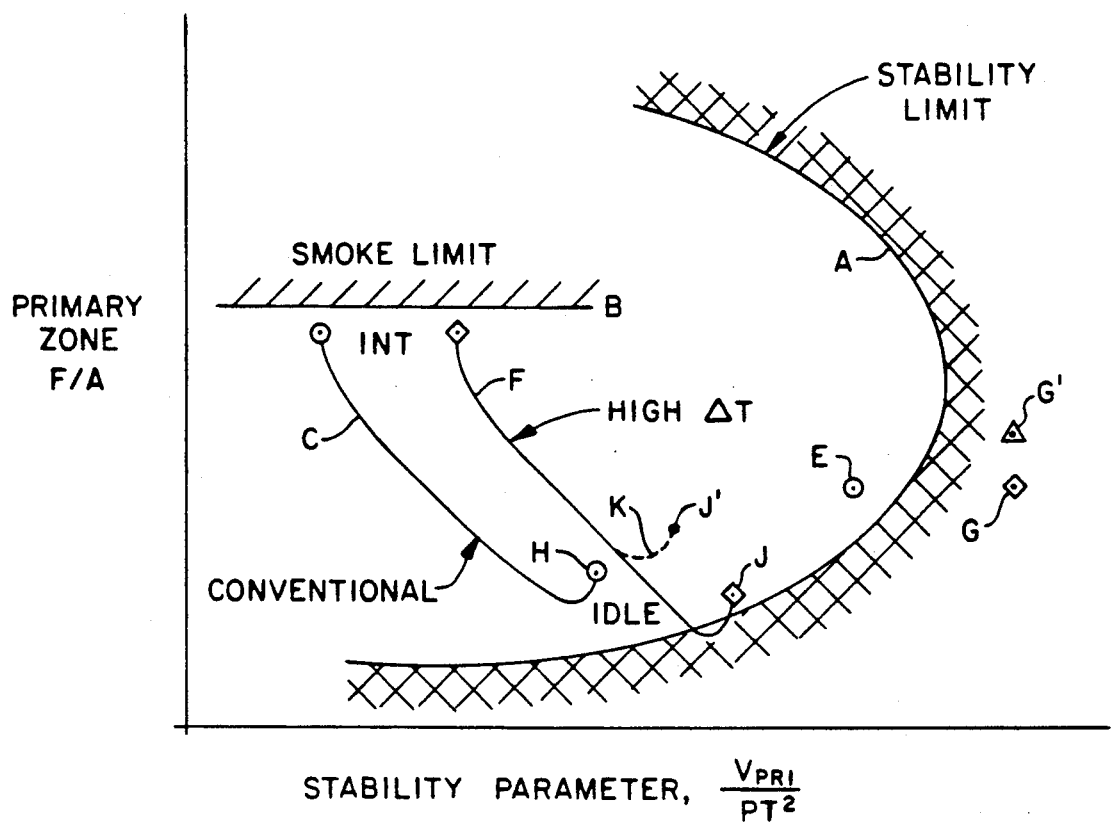
FIG. 1 is a typical graph illustrating the combustor operation, the stability limit and smoke limit in the primary zone of a combustor where the fuel/air ratio is plotted against the stability parameter.
Figure 4:
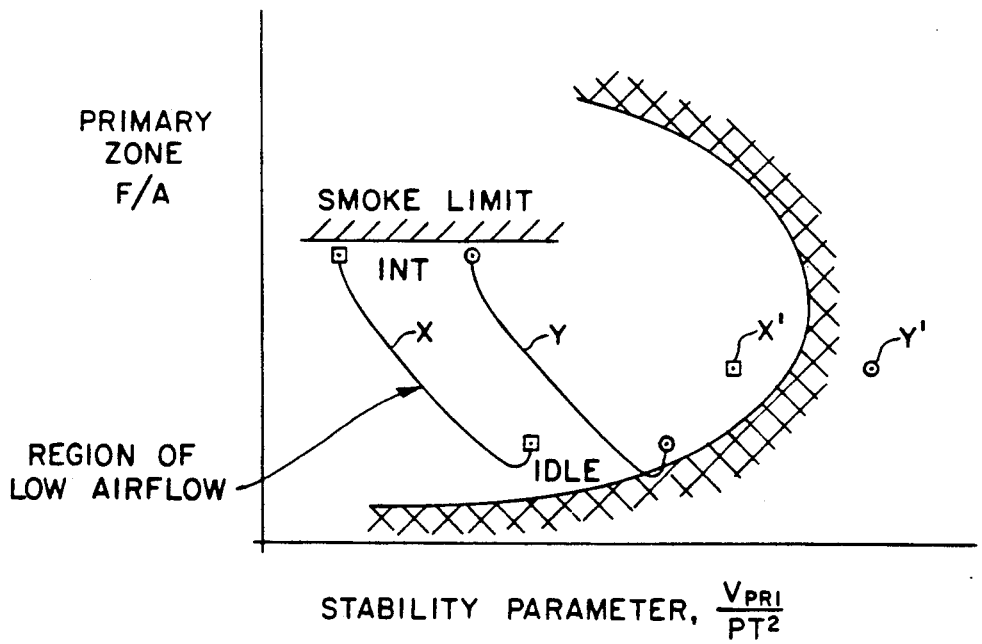
FIG. 4 is the identical graph of FIG. 1 but modified to illustrate the combustor operating liner of the present invention.

The significance of providing sectors as shown by this invention is best seen by referring to FIG. 4 which is a graph similar to the one shown in FIG. 1. As noted curve X represents the operation of the combustor in the low airflow sector and curve Y represents the operation in the other sector. As will be apparent the ignition point X' in the low airflow sector falls within the stable zone of operation while the ignition point Y' of the higher airflow sector is outside the stability zone. Because the ignition point of the low airflow sector is in the stable region it will be capable of sustaining combustion and propagating combustion to the higher airflow regions.

To achieve uniformity as mentioned above the fuel flow is distributed to match or balance the airflow in each of the sectors so as to provide a uniform exit fuel-/air ratio or temperature rise. This will not only enhance engine operation but also will tend to extend the life of the turbine. Obviously, the reduced fuel flow can be achieved in several ways as for example by reducing the flow schedules in the region of reduced airflow or by separately metering fuel flow to the two zones by use of the fuel control. However, in the preferred embodiment it is contemplated that different sized fuel nozzles will be utilized.

Figure 5:
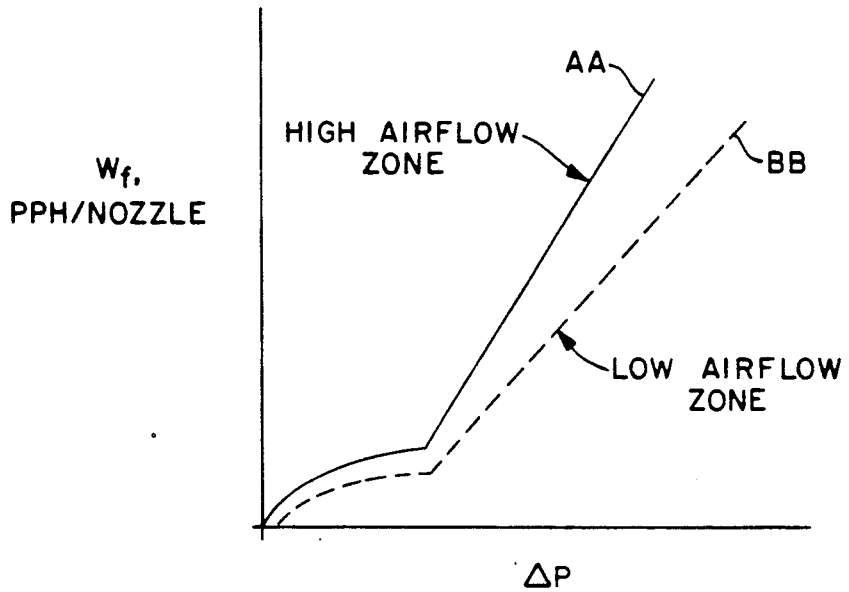
FIG. 5 is a graphical representation of the fuel flow of the nozzles in the sectored dome of the combustor where fuel flow (Wf) is plotted against nozzle pressure drop ($\Delta P$).

The fuel flow schedule is shown in FIG. 5 where curve AA shows the schedule of fuel flow for the high airflow zone and curve BB illustrates the fuel flow in the low airflow zone. It is also contemplated within the scope of this invention that fuel flow scheduling can be combined with the fuel staging as described above particularly during the operation when fuel flow is at a low value in the low airflow region. In this regime of operation it may be desirable to increase the fuel flow.

As is apparent from the foregoing this invention permits increased temperature use while avoiding the cost, weight and stability limitations described in connection with the double annular configuration and without incurring the high cost, weight and complexity of the variable geometry configurations.

Although this invention has been shown and described with respect to detailed embodiments thereof, it will be understood by those skilled in the art that various changes in form and detail thereof may be made without departing from the spirit and scope of the claimed invention.

We claim:

1. An annular combustor for a gas turbine engine including an elongated annular outer liner and an elongated annular inner liner, a dome enclosing the forward end of the annular combustor being supported to said annular outer liner and said annular inner liner all of which define a combustion zone, a plurality of openings circumferentially spaced in said dome for admitting air into said combustion zone, at least one row of fixed openings in said inner annular liner and outer annular liner circumferentially spaced within a transverse plane for admitting air radially into said combustion zone, a portion of said plurality of openings in said dome and a portion of said row of fixed openings being dimensioned to admit a reduced level of air relative to the amount of air being admitted by the remaining openings in said dome and said fixed openings in a given sector of said combustion zone from the level outside of said sector so that said sector operates stable under all combustor operating conditions and when said portion outside said sector operates in a non-stable condition.

2. An annular combustor as in claim 1 including a plurality of fuel nozzles mounted in said dome and circumferentially spaced therein and where said openings in said dome include air swirlers in said fuel nozzles.

3. An annular combustor for a gas turbine engine including an annular outer line, an annular inner liner concentrically disposed relative to each other and defining a combustion zone, means attached to said inner and outer liners including a dome closing one end of the combustion zone, a plurality of circumferentially spaced openings in said dome for admitting air into said combustion zone, at least one row of circumferentially spaced fixed openings in said annular inner liner and said annular outer liner and being axially disposed relative to said dome for admitting additional air in said combustion zone, a plurality of fuel nozzles disposed in said dome for feeding fuel into said combustion zone for producing products of combustion for use in said gas turbine engine, a given sector formed in said combustion zone by providing a portion of said openings in said dome at a reduced area relative to the area of the remaining openings and a portion of said fixed openings in said annular inner liner and said annular outer liner at a reduced area relative to the area of the remaining fixed openings and means to preselect the flow of fuel to match the fuel flow to the distribution of air flow into said sector and said non-sector portion of said combustion zone to attain a uniform fuel air ratio throughout said combustion zone.

4. An annular combustor as claimed in claim 3 including means for scheduling the fuel flow so that the amount of fuel delivered to said sector is increased to a higher value during the combustor operation when feeding minimum quantity of fuel.

* * * * *